J. B. HALL.
PLASTIC CAKE AND CONTAINER THEREFOR.
APPLICATION FILED MAY 11, 1914.
1,121,181.  Patented Dec. 15, 1914.
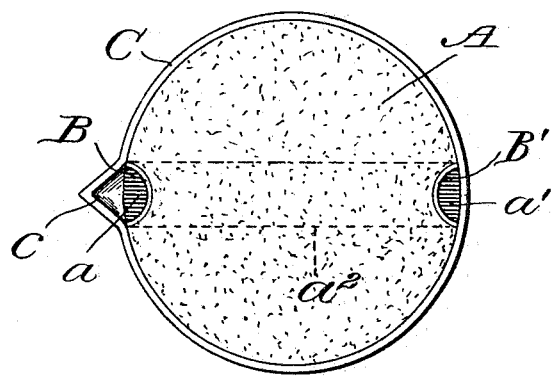
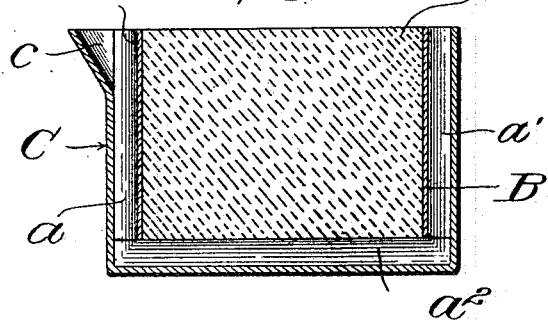
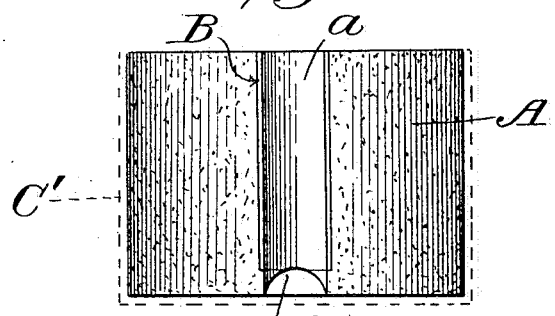
Witnesses
C. M. Walker,
Ira M. Jones.
Inventor,
James B Hall.
By Chas. E. Riordon
Attorney

UNITED STATES PATENT OFFICE.

JAMES B. HALL, OF PHILADELPHIA, PENNSYLVANIA.

PLASTIC CAKE AND CONTAINER THEREFOR.

1,121,181.   Specification of Letters Patent.   Patented Dec. 15, 1914.

Application filed May 11, 1914. Serial No. 837,922.

*To all whom it may concern:*

Be it known that I, JAMES B. HALL, a citizen of the United States, residing at Philadelphia, county of Philadelphia, and State of Pennsylvania, have invented certain new and useful Improvements in Plastic Cakes and Containers Therefor, of which the following is a full, clear, and exact specification.

This invention relates to plastics, especially to substances which will melt under a comparatively slight rise in temperature, such as wax, paraffin, and grease. Heretofore, these substances, particularly wax or paraffin, have been sold in cakes or blocks of various sizes wrapped in paper. In order to use some of the cake in a melted state, it has been necessary to melt the whole mass before the desired quantity can be poured out. Then, when the necessary amount has been poured off, the residue or remaining portion is often wasted for the lack of a suitable and convenient receptacle in which to preserve it. Moreover, the usual paper wrapping does not protect the cake from rats and mice.

It is the object of the present invention to produce a cake or block of plastic substance of the nature referred to, which is so shaped that a portion only thereof may be melted and poured without waiting for the whole mass to melt, whereby the portion which it is not necessary to use at the time may be preserved in its solid state and considerable time saved in the melting process.

Another object is to provide a receptacle for packing and storing the plastic cake in order that it may be preserved in good condition until the last remnant thereof has been used.

Further objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used throughout the several views to designate corresponding parts: Figure 1 is a plan view of a plastic cake and container made in accordance with my invention; Fig. 2 is a central vertical section of the same, and Fig. 3 is a side elevation of the plastic cake alone, the walls of an ordinary container being indicated, however, in dotted lines.

In order to permit a portion of the plastic cake A to be melted and poured off without necessitating the melting of the entire mass, said cake is molded with a pouring passage or perforation $a$ extending from the surface to the bottom thereof and preferably arranged at the edge of the cake as shown, although it is obvious that said passage or perforation might be from the edge if desired. A vent passage or perforation $a'$ is also molded in the cake and likewise extends from the surface to the bottom thereof, in order to prevent the formation of a vacuum when the melted substance is being poured out through the pouring passage $a$. The vent passage, as shown, may be at the edge of the cake diagonally opposite the pouring passage, but this location is not essential. It is also obvious that instead of a single vent passage, or pouring passage, either, for that matter, a plurality of such passages may be molded in the cake, the making of more than one of said passages of either kind amounting simply to a repetition of the molding of one of them and hence not requiring illustration. It is well known that when a cake of this kind is placed in a container over the fire, the bottom of the cake, which is next the fire, will melt first. It is with this principle or rule in view that I have provided the cake with the pouring and vent openings or passages as shown and described, so that when a sufficient portion of the bottom of said cake has been melted, it may be poured off through the pouring passage $a$ before the upper portion of the cake is melted, the vent passage $a'$ allowing air to enter the space below the solid cake vacated by the melted portion as the latter is poured off. To further facilitate the admission of air to this space, and consequently the pouring off of the melted portion from the bottom through the pouring passage, a groove or grooves $a^2$ may be molded or otherwise formed of any desired depth from the bottom of the cake joining the pouring and vent passages, as clearly illustrated in Figs. 2 and 3, although this bottom groove is not deemed essential. If desired, the walls of the pouring and vent passages may be reinforced or buttressed by tubular members B and B', respectively, of any suitable material, perforated or imperforate, such as paper, sheet metal, or wood. These members may be utilized as cores in the molding of the cake, or other suitable cores (not shown) may be used and the tubular members inserted after the cake has hardened and the cores have been taken out.

My invention also contemplates the manufacture and sale of plastic cake, formed as already described, in a receptacle or container such as is shown at C in Figs. 1 and 2. The provision of this container insures a suitable melting pot being always at hand and also provides a convenient means for preserving the remainder of the original cake after one or more meltings of its bottom portion. Said container C is preferably provided with a pouring spout c opposite the pouring passage a, Figs. 1 and 2, to further facilitate the flow of the melted portion of the substance from the container. It will be understood, however, that the cake made as hereinbefore described may be sold without the container and placed in any ordinary vessel, as indicated at C' in Fig. 3, for melting, such common vessel or container not necessarily having a spout, the pouring and vent openings or passages in the cake itself being sufficient to accomplish my purpose of pouring a melted portion from the bottom of the cake without melting the upper portion of said cake, as has heretofore been necessary.

In the event of any of the melted material remaining in the passages after the cake has been used in the manner hereinbefore described, and the same hardens herein, such material may be removed before next using the cake by means of any suitable tool or a small piece of wire would answer the purpose.

Having thus described my invention, what I claim as new and desire to secure by Letters Patent of the United States is:

1. A plastic cake having a plurality of spaced passages on the sides thereof, and a groove in the bottom of the cake joining said passages.

2. The combination with a plastic cake having a pouring passage molded therein at one edge thereof, and a vent passage also molded in the cake at a distance from the pouring passage and a groove in the bottom of the cake joining such passages, of a container in which the cake is fitted, and a spout on the container arranged opposite the pouring passage in the cake.

3. The combination with a plastic cake having a pouring passage molded therein at one edge thereof and a vent passage also molded in the cake at a distance from the pouring passage, and a groove in the bottom of the cake joining said passages, of a container in which the cake is fitted, substantially as and for the purpose set forth.

In testimony whereof I have signed my name to this specification in the presence of two attesting witnesses.

JAMES B. HALL.

Witnesses:
Wm. Bauer,
J. J. Hayes.

Copies of this patent may be obtained for five cents each, by addressing the "Commissioner of Patents, Washington, D. C."